United States Patent
Bohnker et al.

(10) Patent No.: US 11,467,058 B2
(45) Date of Patent: Oct. 11, 2022

(54) SENSING AND CONTROL OF FLOWS OVER MEMBRANE WINGS

(71) Applicant: BROWN UNIVERSITY, Providence, RI (US)

(72) Inventors: Jillian R. Bohnker, Bristol, RI (US); Kenneth S. Breuer, Newton, MA (US)

(73) Assignee: BROWN UNIVERSITY, Providence, RI (US)

( * ) Notice: Subject to any disclaimer, the term of this patent is extended or adjusted under 35 U.S.C. 154(b) by 417 days.

(21) Appl. No.: 16/685,840

(22) Filed: Nov. 15, 2019

(65) Prior Publication Data

US 2020/0173883 A1 Jun. 4, 2020

Related U.S. Application Data

(60) Provisional application No. 62/868,537, filed on Jun. 28, 2019, provisional application No. 62/768,648, filed on Nov. 16, 2018.

(51) Int. Cl.
*G01M 9/06* (2006.01)
*G01M 9/08* (2006.01)
(Continued)

(52) U.S. Cl.
CPC ............... *G01M 9/06* (2013.01); *B64C 3/14* (2013.01); *G01B 7/16* (2013.01); *G01L 1/14* (2013.01); *G01M 9/08* (2013.01)

(58) Field of Classification Search
CPC .......... G01M 9/04; G01M 9/06; G01M 9/062; G01M 9/02; G01M 9/065; G01M 9/08; G01M 9/067; G01M 17/007; G01M 9/00; G01M 10/00; G01M 15/02; G01M 17/0074; G01M 17/0072; G01M 99/00; G01M 1/22; G01M 15/14; G01M 17/00; G01M 5/0016; G01M 5/0066; G01M 1/122; G01M 1/28; G01M 1/30; G01M 1/36; G01M 11/083; G01M 11/088; G01M 13/027; G01M 17/0076; G01M 17/013; G01M 3/181; G01M 3/2838; G01M 5/0033;
(Continued)

(56) References Cited

FOREIGN PATENT DOCUMENTS

| FR | 2987677 A1 | * | 9/2013 | .......... G01M 5/0016 |
| WO | WO-2019011489 A1 | * | 1/2019 | ............. F03D 17/00 |

OTHER PUBLICATIONS

Rizzello, Gianluca & Naso, David & York, Alexander & Seelecke, Stefan. (2017). A Self-Sensing Approach for Dielectric Elastomer Actuators Based on Online Estimation Algorithms. IEEE/ASME Transactions on Mechatronics. 22. 728-738. 10.1109/TMECH.2016. 2638638.

(Continued)

*Primary Examiner* — Andre J Allen
(74) *Attorney, Agent, or Firm* — Adler Pollock & Sheehan P.C.

(57) ABSTRACT

A method includes simultaneously controlling and sensing aerodynamic loading of a membrane wing using a capacitance of the membrane, the membrane wing stretching under aerodynamic load, leading to thinning of a membrane thickness and increased capacitance, and using knowledge of the membrane's elastic and dielectric material properties to determine an amount of steady aerodynamic lift being generated.

11 Claims, 7 Drawing Sheets
(5 of 7 Drawing Sheet(s) Filed in Color)

(51) Int. Cl.
*B64C 3/14* (2006.01)
*G01L 1/14* (2006.01)
*G01B 7/16* (2006.01)

(58) Field of Classification Search
CPC ...... G01M 5/005; G01M 5/0083; G01M 7/02; G01M 7/022; G01M 7/025; G01M 7/04; G01M 7/08; G01M 99/004; G01M 11/30; G01M 13/00; G01M 3/20; G01M 3/202; G01M 5/00; G01M 99/002; G01L 5/1627; G01L 19/0007; G01L 19/0015; G01L 11/02; G01L 5/16; G01L 5/12; G01L 5/133; G01L 5/162; G01L 5/161; G01L 9/08; G01L 15/00; G01L 23/12; G01L 23/125; G01L 5/168; G01L 9/0051; G01L 9/065; G01L 1/24; G01L 19/0636; G01L 19/0654; G01L 19/147; G01L 23/10; G01L 27/00; G01L 5/167; G01L 7/00; G01L 1/086; G01L 1/148; G01L 1/16; G01L 1/2206; G01L 1/2243; G01L 1/2268; G01L 1/26; G01L 11/04; G01L 13/02; G01L 19/00; G01L 19/003; G01L 19/0038; G01L 19/04; G01L 19/08; G01L 19/148; G01L 27/005; G01L 5/163; G01L 5/164; G01L 7/18; G01L 9/00; G01L 9/0002; G01L 9/0035; G01L 9/006; G01L 9/007; G01L 9/0077; G01L 9/10; G01L 9/12; G01L 1/2262; G01L 19/149; G01L 7/024
USPC .......................................................... 73/147
See application file for complete search history.

(56) References Cited

OTHER PUBLICATIONS

Rosset, Samuel & O'Brien, Benjamin & Gisby, Todd & Xu, Daniel & Shea, Herbert & Anderson, Iain. (2013). Self-sensing dielectric elastomer actuators in closed-loop operation. Smart Materials and Structures. 22. 104018. 10.1088/0964-1726/22/10/104018.

Bohnker, Dissertation Sensing and Control of Flows over Membrane Wings, published Jun. 3, 2019.

Harmon, Robyn Lynn, Aerodynamic Modeling of a Flapping Membrane Wing Using Motion Tracking Experiments, ProQuest LLC, Ann Arbor, Mich., 2009 (https://drum.lib.umd.edu/handle/1903/8968).

Peter S. Jackson, Michael S. Johnston and Richard G. J. Flay, Some Aspects of the Aerodynamics of Membrane Wings, 14th Australasian Fluid Mechanics Conference Adelaide University, Adelaide, Australia (Dec. 10-14, 2001).

S. Greenhalgh and H. C. Urtiss, Aerodynamic characteristics of a flexible membrane wing, AIAA Journal, vol. 24, No. 4 (Apr. 1986).

Yaakov Abudaram, Bret Stanford and Peter Ifju, Wind Tunnel Testing of Load-Alleviating Membrane Wings at Low Reynolds Numbers, 47th AIAA Aerospace Sciences Meeting Including The New Horizons Forum and Aerospace Exposition, Jan. 5-8, 2009, Orlando, Florida.

Hays MR, Morton J, Dickinson B, Chakravarty UK, Oates WS. Aerodynamic control of micro air vehicle wings using electroactive membranes. Journal of Intelligent Material Systems and Structures. 2013;24(7):862-878. doi:10.1177/1045389X12470303.

Bohnker, Jillian & Breuer, Kenny. (2018). Control of separated flows over membrane wings. 10.2514/6.2018-4249.

* cited by examiner

SENSING AND CONTROL OF FLOWS OVER MEMBRANE WINGS

CROSS REFERENCE TO RELATED APPLICATIONS

This application claims benefit from U.S. Provisional Patent Application Ser. No. 62/768,648, filed Nov. 16, 2018, and U.S. Provisional Patent Application Ser. No. 62/868,537, filed Jun. 28, 2019, which are both incorporated by reference in their entireties.

STATEMENT REGARDING GOVERNMENT INTEREST

This invention was made with government support under Grant Number W911QY-17-2-0001, awarded by the United States Army Soldier Systems Center. The government has certain rights in the invention.

BACKGROUND OF THE INVENTION

The present invention relates generally to wing kinematics, and more particularly to sensing and control of flows over membrane wings.

In general, approaches for measuring membrane wing kinematics, such as direct linear transformation (DLT) and digital image correlation (DIC), require multiple high speed and high-resolution cameras to resolve the three dimensional shape of the membrane. Other methods, such as laser doppler vibrometry, often lack sufficient dynamic range, and require precise positioning and focus. All of these methods require substantial equipment mounted around the wing. And none of these methods are integrated.

SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In general, in one aspect, the invention features a method including providing an extensible membrane wing, performing integrated camber sensing, a camber measured via capacitance of a dielectric elastomer membrane that is sandwiched between two compliant electrodes, wherein a relationship between capacitance and camber is defined, and estimating a load on the extensible membrane wing using the camber.

In another aspect, the invention features a method including simultaneously controlling and sensing aerodynamic loading of a membrane wing using a capacitance of the membrane, the membrane wing stretching under aerodynamic load, leading to thinning of a membrane thickness and increased capacitance, and using knowledge of the membrane's elastic and dielectric material properties to determine an amount of steady aerodynamic lift being generated and time-dependent properties.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The patent or application file contains at least one drawing executed in color. Copies of this patent or patent application publication with color drawing(s) will be provided by the Office upon request and payment of the necessary fee. So that those having ordinary skill in the art to which the disclosed system appertains will more readily understand how to make and use the same, reference may be had to the following drawings.

These and other features, aspects, and advantages of the present invention will become better understood with reference to the following description, appended claims, and accompanying drawings where:

DETAILED DESCRIPTION

Figure 1:
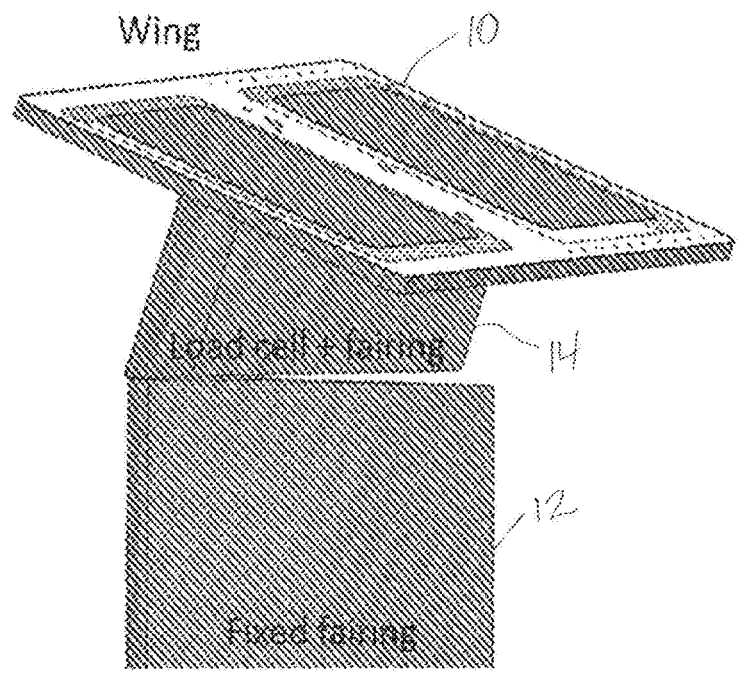
FIG. 1 is an exemplary membrane wing.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

The present invention provides a method to simultaneously control and sense aerodynamic loading of a membrane wing using the capacitance of the membrane. A compliant membrane wing stretches under aerodynamic load, which leads to thinning of the membrane thickness and increased capacitance. Using knowledge of the membrane's elastic and dielectric material properties, this information is used to determine both the amount of steady aerodynamic lift being generated, as well as time-dependent properties such as lift fluctuation, vortex shedding frequency and timing.

In general, due to the compliant nature of extensible membrane wings, there exists a close relationship between the membrane wing camber and the aerodynamic load. Additionally, the membrane dynamics are often linked to unsteady large-scale flow structures, such as sheer layer separation were leading edge vortex shedding. The integrated real-time measurement of the membrane configuration, including both mean camber and the frequency content of vibration, would lead to significant information on the surrounding flow field. The present invention is a method of integrated camber sensing, showing a relationship to aerodynamic load and the flow field. Camber is measured by the capacitance of the dielectric elastomer membrane, which is sandwiched between two compliant electrodes. The relationship between capacitance and camber is defined geometrically. The mean aerodynamic load is shown to be well captured by applying a simple aeroelastic analysis to the measured camber. Time-resolved flow field measurements are used to illustrate the ties between the dynamic camber, as measured by composites, and large-scale flow structures surrounding the wing. The present invention is a step towards developing an integrated, closed loop control method for membrane wings.

Dielectric elastomers have been shown to be effective as both actuators and self-sensors. A dielectric elastomer actuator (DEA) consists of an elastomeric membrane sandwiched between two compliant electrodes. When driven as actuators, a high voltage generates an out-of-plane strain, which is converted into an in-plane strain due to the incompressible nature of the material. In an aerodynamic environment, this strain can be used to generate both steady and unsteady changes in camber, when coupled with the aerodynamic pressure difference across the membrane.

As a self-sensor, the same DEA configuration can be driven with a high frequency/low voltage signal to measure the capacitance of the membrane. As the membrane is deformed, the thickness decreases and the capacitance increases. In the context of a membrane wing under an aerodynamic load, this increase in capacitance may be used to approximate mean camber, which is related to mean aerodynamic load. Additionally the variation of camber as a function of time can be tied to dynamic large-scale flow structures, such as shear layer location in vortex shedding.

The connection between membrane wing camber and aerodynamic loading is governed by a non dimensional aeroelastic number. This non-dimensional number can take different forms based on the level of pretension in the wing. It should be noted that this is not the only parameter that governs the connection between camber and loading. Other factors are also important, such, for example, Reynolds number, angle of attack, pre-stretch, and so forth.

Membrane wings, by nature, respond unsteadily to any unsteady component of the surrounding flow field. Because of this, the dynamic camber of a membrane wing can often be linked to large-scale flow structures, such as the relative location of the shear layer or the frequency of vortex shedding. The frequency of membrane vibration has been shown to "lock in" with the vortex shredding frequency, particularly near multiples of the natural frequency of the membrane.

In the present invention, capacitive self-sensing is useful in membrane wing aerodynamics. Capacitance is measured using an RLS adaptive algorithm. Wind tunnel measurements using a flat rectangular membrane wing are shown, including aerodynamic load, capacitance, and single-point camber measurements using a laser displacement sensor. The relationship between these variables are explored over a range of angles of attack and freestream velocities, using two membrane materials. Time-resolved PIV is used to show links between capacitance measurements and large-scale flow structures. This application of dielectric membrane self-sensing may be incorporated with existing methods for membrane wing active flow control to an able closed-loop control of membrane wings.

As shown in FIG. 1, an exemplary membrane wing 10 is attached to a rigid frame 12. A load cell 14 is mounted on a custom angle of attack adapter. More specifically, in one embodiment, to test the performance of capacitive self-sensing under aerodynamic load, membrane wing frames are constructed of acrylic, with a span of 180 mm, a chord of 90 mm, and a thickness of 6.35 mm.

Figure 2:
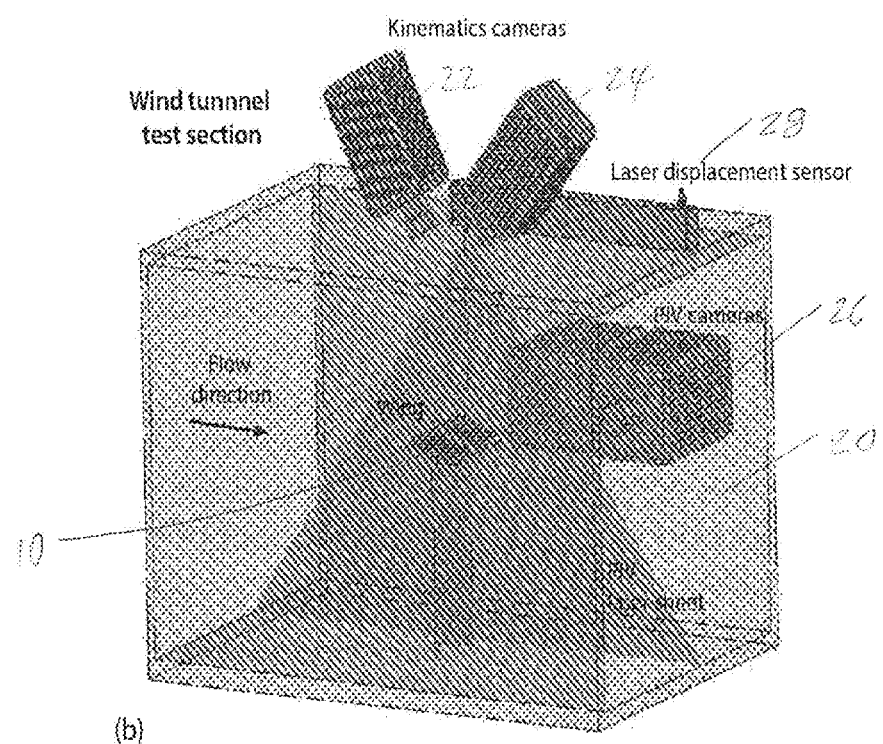
FIG. 2 is an exemplary test setup.

As shown in FIG. 2, the membrane wing 10 of FIG. 1 is mounted in a center of a wind tunnel test section 20. Kinematics cameras 22, 24 are used to capture membrane kinematics, 2D-2C PIV 26 is used to measure surrounding flow, and a single point laser displacement sensor 28 measures a displacement at a center of a membrane segment. Specifically, the membrane wing 10 was tested in a closed-loop wind tunnel, in the center of a test section measuring 0.61 m×0.61 m in cross-section and 2.4 m in length. The membrane wing 10 was positioned at a fixed angle of attack, using a fixed fairing in a custom angle-of-attack adapter. A six-axis load cell was installed at the wing's quarter-chord for measurement of the aerodynamic loads and torques. To ensure load cell accuracy, the temperature in the test section was controlled to within 0.1° of tear temperature using a water cooled heat exchanger. Aerodynamic load data was collected at 10 kHz.

A single point laser displacement sensor was positioned outside the test section and focused on a center of one of the membrane segments. The displacement of the membrane at this location was recorded at 1 kHz. Additionally, two high-speed cameras were used to capture 2D-2C PIV data in a plane parallel to the wing chord, at quarter-span (the center of the membrane segment). The plane was illuminated with a laser sheet generated using a double pulsed Nd:YLF laser, with an energy output of approximately 30 mJ/pulse. PIV data was captured at a rate of 500 Hz.

Two data sets were collected for analysis. In the first data set, only aerodynamic load and single point membrane displacement data were collected, but at fine resolution freestream velocity and angle of attack. Freestream velocities between 2 and 25 m/s were captured, with a resolution of 2 m/s. Angles of attack were varied from 2° to 30°, in increments of 2°-5°. In addition to varying the velocity and angle of attack, both membrane materials were tested. Finally, data was collected both with and without high voltage actuation. Without actuation, a sinusoidal probe voltage of 1500 Hz and 200 V was applied. For high-voltage actuation, the same probe voltage was superimposed on an actuation voltage of the form of $V(t)=2000(1+\sin 2\pi f_{act}t)$, with actuation frequencies ($f_{act}$) ranging from 20 Hz to 75 Hz. In all cases, the voltage and current across the wing membrane were recorded at 60 kHz, with a duration of 60 seconds.

In the second data set, a primary goal is to capture unsteady interactions between the membrane kinematics and the surrounding float field, as such, this data set includes the full complement of data streams: PIV data, single point membrane displacement data, membrane capacitance, and aerodynamic load data. In one example, the analysis focused on a single set of experimental conditions: a VHB membrane wing at 5° angle of attack and 16 m/s freestream velocity. This data set was chosen due to a significant amount of observed membrane vibration in the proximity of the shear layer to the membrane.

Capacitive self-sensing was demonstrated on a membrane wing under aerodynamic load. The camber of the wing was estimated by assuming the membrane geometry to be approximately that of a spherical cap. With that assumption, it was shown that:

$$z^* = \sqrt{\frac{\lambda-1}{4}} = \sqrt{\frac{\sqrt{C/C_0}-1}{4}},$$

Where $z^*$ is the membrane camber, $\lambda$ is the camber-induced stretch, $C$ is the instantaneous capacitance, and $C_0$ is the capacitance of the uncambered wing. It should be noted that the spherical cap approximation deviates slightly from the deformation of a pre-tensioned square membrane under uniform load, which can be closely approximated as:

$$z_{sq}^* = 0.0737 \frac{Pc^2}{T},$$

Where P is the uniform applied pressure, c is the membrane wing chord, and T is membrane tension.

Figure 3:
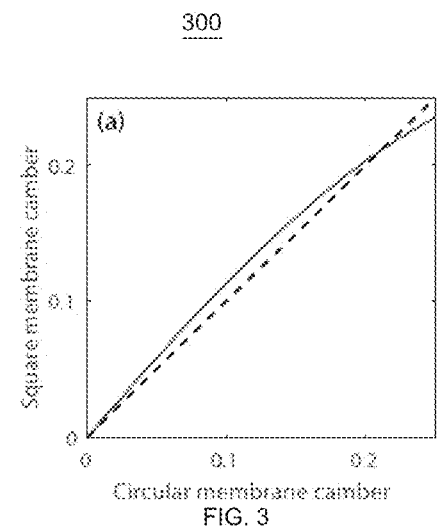
FIGS. 3-8 are exemplary graphs.
Figure 4:
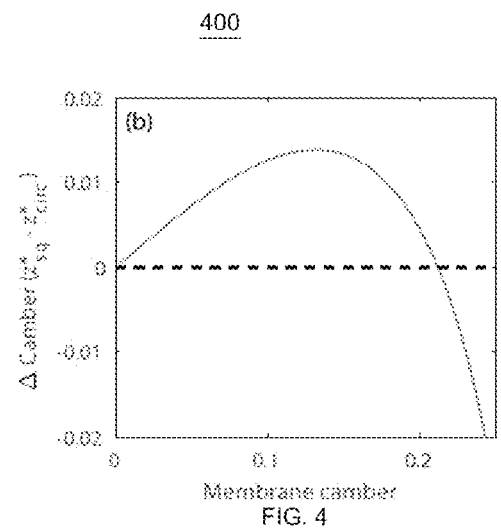

FIG. 3 illustrates a graph 300 of the camber predicted for a circular vs. square membrane under uniform pressure while FIG. 4 illustrates a graph 400 of the error in camber for the range of chambers observed herein. Specifically, as shown in FIG. 3, comparing the expected cambers from each of these expressions over the range of cambers observed, the spherical cap assumption results in overestimations by as much as 1.4% camber at 13.1% camber, while underestimating for cambers in excess of 21.3%. However, the spherical cap assumption enables the use of a simple analytical expression four membrane strain, which is not available for a square membrane under equivalent conditions.

Figure 5:
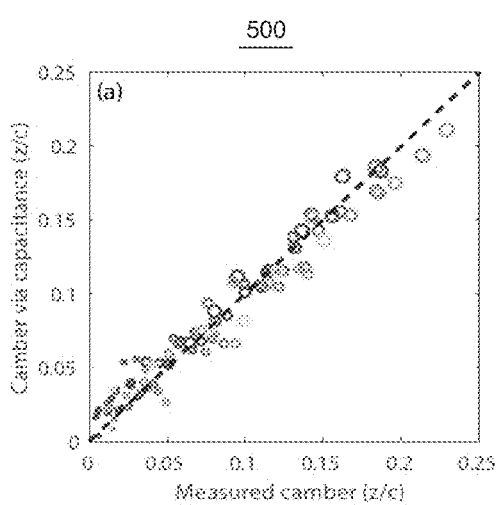
Figure 6:
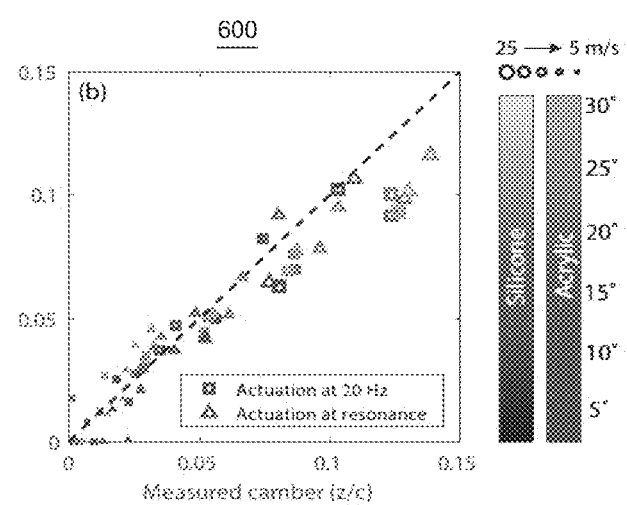

FIG. 5 and FIG. 6 illustrate the capacitance calculated with a recursive least squares (RLS) algorithm compared to the camber as measured using the single-point laser displacement sensor. In FIG. 5, graph 500 shows the comparison in the absence of high-voltage actuation, with only the probe voltage applied. Fairly close agreement between the displacement sensor and the camber measured by capacitance is seen, but at cambers above 4 to 5%. At low cambers, more scatter is seen.

In FIG. 6, graph 600 shows the same comparison during high voltage fluctuation of the membrane, with the low amplitude/high frequency probe voltage superimposed over the high amplitude/low frequency actuation voltage. In each experimental condition, actuation was performed at two frequencies: constant frequency well below resonance (20 Hz), as well as the membrane resonance frequency. The resonance frequency is influenced by a camber induced strain and ranged from 54 to 75 Hz, as was identified for each run using a frequency sweep. For both frequency conditions, good agreement is generally seen between the displacement center camber and the camber measured by capacitance, though capacitive self-sensing tends to underestimate the camber at higher mean camber values. The reason for this loss of accuracy may be connected to a spherical cap geometric assumption.

Figure 7:
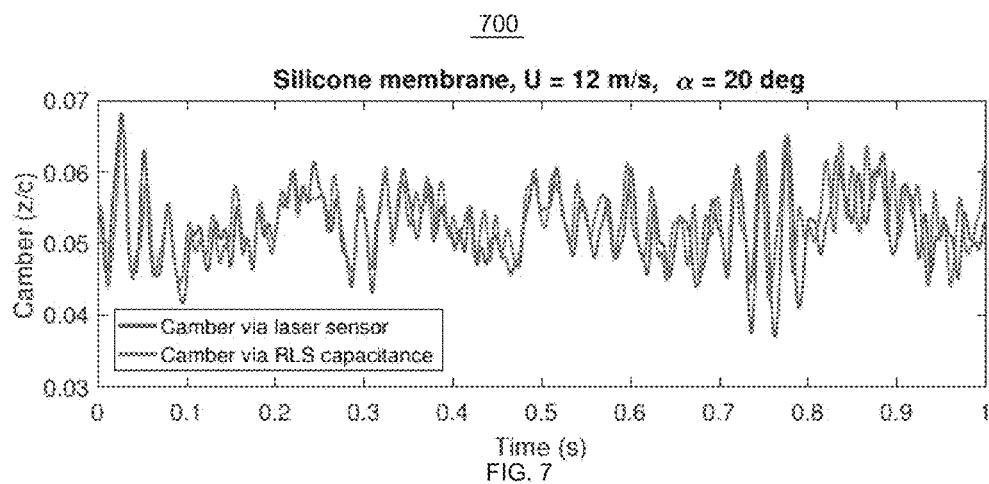

In addition to measuring the time average camber, capacitive self-sensing is capable of measuring the dynamic camber of the membrane. A representative time series 700 is shown in FIG. 7, comparing the camber measured by both displacement sensor and capacitive self-sensing over the course of one second. Good qualitative agreement is seen between the two methods, with large-scale changes in camber being well captured and the frequency content appearing to be quite similar. Some variations in amplitude are seen (e.g., between 0.7 and 0.9 seconds) and some areas seem to have different frequency content (e.g., between 0.8 and 0.9 seconds). However, these variations are to be expected when comparing single-point and full field measuring techniques.

Figure 8:
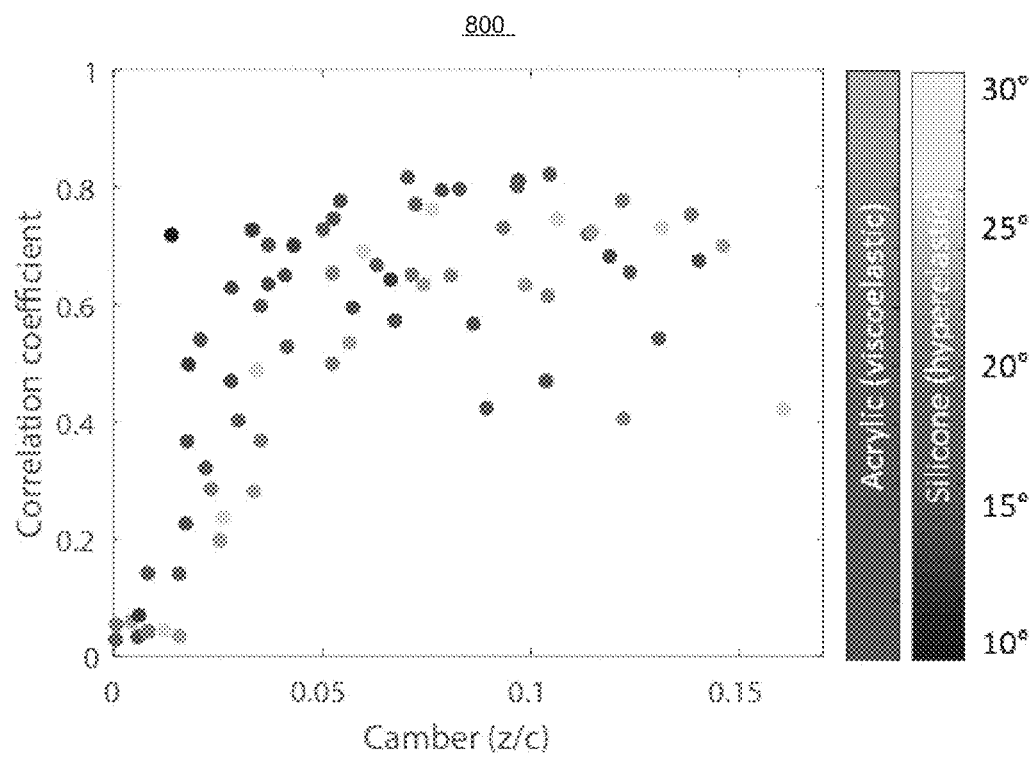

The correlation between the two measurement techniques can be quantified using a cross correlation analysis on the full 60 seconds duration of each measurement period. The cross correlation coefficient may vary from zero, indicating absolute lack of correlation, to unity, indicating perfect correlation. The time series 700 in FIG. 7, for example, has a cross correlation coefficient 0.744. In FIG. 8, in graph 800, this coefficient is shown for all tested configurations as a function of mean camber. The correlation is seen to be poor at cambers below 4% before reaching a plateau roughly 0.5-0.8 at higher mean cambers. Because the camber measurement is a function of the time varying capacitance normalized by the unrestrained capacitance, small changes are difficult to detect. Ultimately, capacitive self-sensing appears to produce reliable results at mean camber values above 4%, in both mean camber and dynamic camber measurements.

The camber can be used to estimate the aerodynamic load on the membrane. The Young-Laplace equation allows the curvature of the membranes ($\kappa$) to be balanced with the aerodynamic pressure (p) and the tension in the membrane (T):

$$\kappa + p/T = 0,$$

which can be rearranged to solve for the pressure on the membrane:

$$p = T\kappa.$$

Assuming a uniform pressure distribution, linear elasticity in the membrane (i.e., $T = Eh(\gamma-1)$), and a membrane shape that can be approximated by a spherical cap geometry (i.e., $\kappa = 8z^*/(1+4z^{*2})$), the force acting normal to the membrane (i.e., pressure) can be solved as:

$$F_N = Eh(\lambda - 1)\frac{8z^*}{1 + 4z^{*2}}$$

where E is the membrane Young's modulus, h is the membrane thickness, $\gamma$ is the instantaneous membrane stretch, and $z^*$ is the membrane camber. With a known angle of attack ($\alpha$), the normal force acting on the membrane can be decomposed into lift (L) and drag (D) force, such that:

$$F_N = L\cos(\alpha) + D\sin(\alpha).$$

Figures 9A, 9B, 9C:
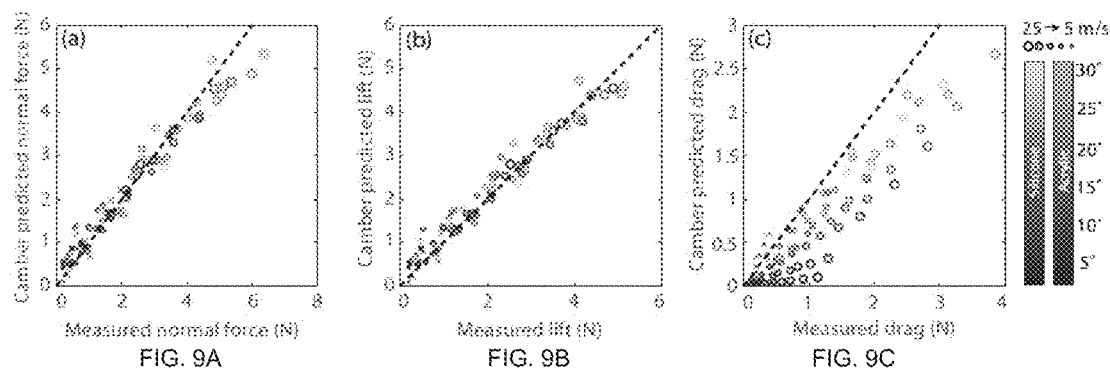
FIGS. 9A, 9B and 9C are exemplary graphs.

Applying this analysis to the data set at hand, the measured normal aerodynamic load is compared to the derived Force using the measured capacitance in FIG. 9A. The measured and predicted normal force collapses well throughout the range of parameters tested, including both silicone and acrylic membranes over a range of angles of attack and freestream velocities. Deviation is seen at the highest loading scenarios, which may indicate that the linear elastic assumption is breaking down with increasing camber induced strain. The normal load is also broken down into lift (FIG. 9B) and drag (FIG. 9C). The lift force is seen to be well collapsed, with some scatter at low forces. This is consistent with an observed increase in error at low cambers, and is a consequence of dividing by the unstrained capacitance to approximate the membrane strain. Finally, the derived drag is seen to be the least accurate quantity, and is consistently underestimated, particularly at low angles of attack. This is likely a result of the increasingly small proportion of the overall normal force that is directed in the drag direction at low angle of attack.

Figures 10A, 10B, 10C:
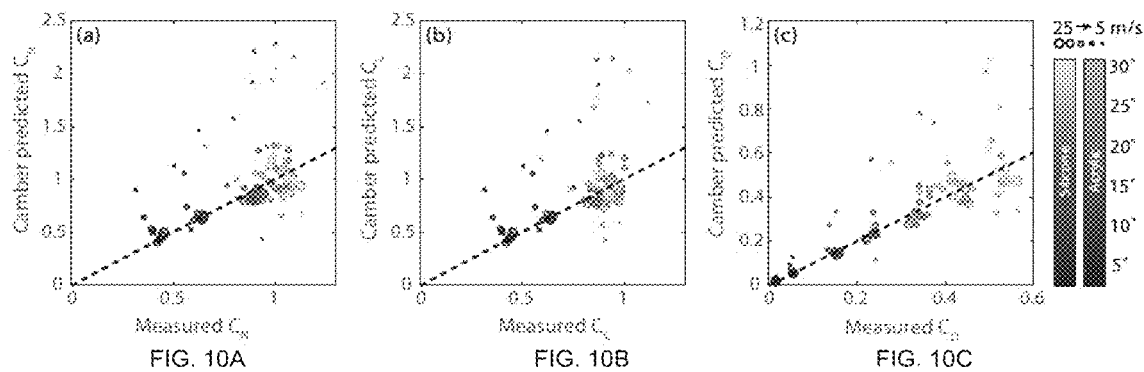
FIGS. 10A, 10B and 10C are exemplary graphs.

The aerodynamic forces being applied to the membrane can be converted into aerodynamic coefficients by dividing by the dynamic pressure. The comparison between measured coefficients and predicted coefficients is shown in FIGS. 10A, 10B and 10C. In all three cases ($C_N$, $C_L$, $C_D$), the freestream velocity is seen to be the strongest predictor of accuracy, with predicted coefficients generally Rising well above measured coefficients as freestream velocity decreases. This loss of accuracy is another reflection of the increasing error at low cambers. Velocity is the primary driver of membrane wing self cambering, with camber increasing roughly proportionately to $U^2$. At low velocities, the mean membrane camber is below the threshold of 4% and accurate measurements are not possible. However, the predicted coefficients, including $C_D$, are seen to be captured with much greater accuracy and higher freestream velocities.

In addition to sensing time averaged camber and aerodynamic forces, capacitive self-sensing can provide some insight into the flow structures surrounding the wing. At high angles of attack, vortex shedding may be the primary phenomena to be captured with capacitive self-sensing. At lower angles of attack, the location of the shear layer relative to the wing surface can be sensed; location, as sensed with capacitance, is accurate using PIV and aerodynamic load data.

Figures 11A, 11B:
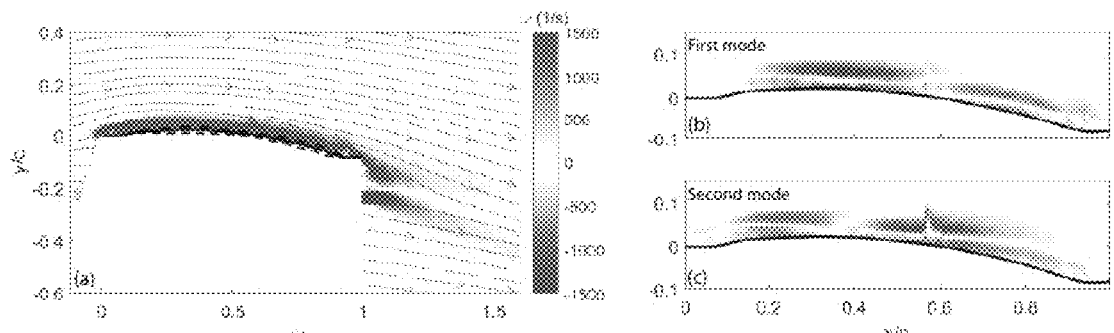
FIGS. 11A and 11B are exemplary graphs.

A wing at 5° angle of attack in a 16 m/s freestream velocity is used for the purposes of demonstration for the present patent application. The mean vorticity field and streamlines are shown in FIG. 11A, where it is seen that the flow remains largely attached to the surface of the wing. In addition to the mean flow field, the mean membrane shape is shown, as well as the standard deviation of the membrane deformation. Under these flow conditions, the mean camber is 5.7%, which is modestly above the cutoff for accurate capacitive self-sensing results, while the standard deviation of the camber is roughly 0.8%.

In addition to the mean flow field, the flow field dynamics are captured using proper orthogonal decomposition (POD), which utilizes an eigenvalue analysis to decompose the unsteady flow field into the most energetic modes. Following the identification of modes, the relative contribution of each mode is calculated at each time step. These coefficients capture the time varying nature of each mode and can be used to calculate frequency content. In FIG. 11B, the first two POD modes of the vorticity field immediately above the wing surface are shown. The first POD mode, in particular, appears to suggest a node at roughly 0.5 c, which will be seen to be reflected in membrane deformation data as well.

Figure 12A:
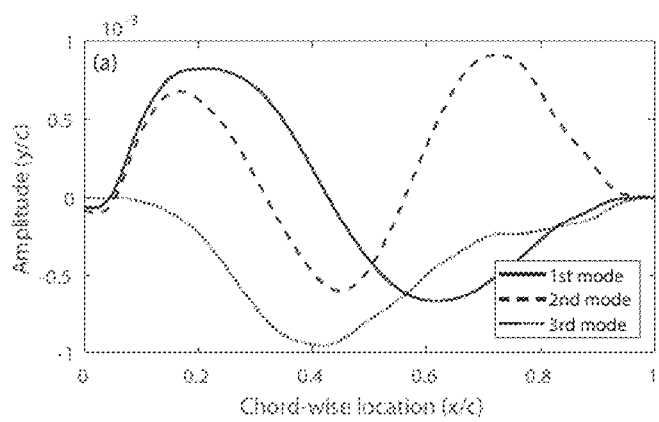
FIGS. 12A and 12B are exemplary graphs.
Figure 12B:
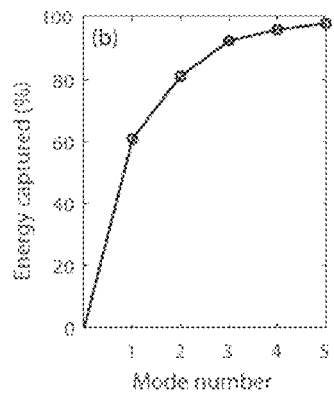

A POD analysis can also be applied to the membrane dynamics, as detected by the reflection of the PIV laser sheet on the membrane surface. The first three POD modes of the membrane deformation are shown in FIG. 12A, as well as the cumulative energy captured by the first five POD modes in FIG. 12B. The first mode, which captures 61% of the membrane dynamics, represents a second mode vibration in the chordwise direction, with a nodal line at a roughly 0.5 c. The second POD mode captures a <1-3> vibration mode, while the third POD mode, in particular, is seen to be tightly coupled with the surrounding flow.

To begin to understand the interplay between the flow field and the wing, the power spectral density (PSD) of several variables can be considered. In addition to lift and capacitance, the PIV POD coefficient and shear layer height were calculated. The shear layer height was defined as the location of maximum vorticity above the membrane. This value is measured as a function of location along the chord, and the sheer layer height at 0.5 c was used for the PSD analysis.

Figure 13:
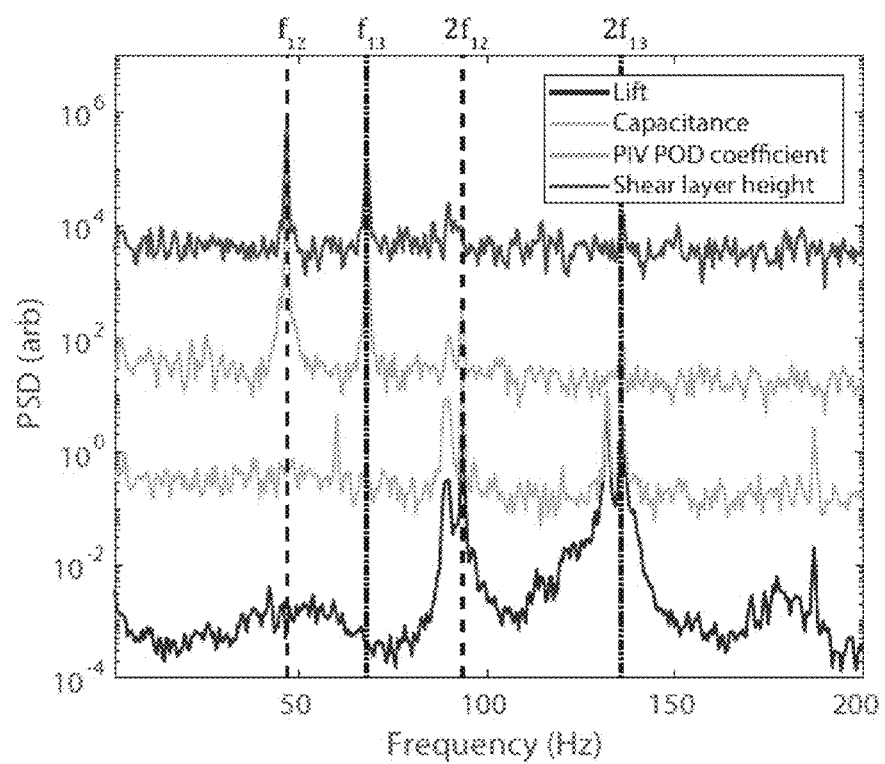
FIG. 13 is an exemplary graph.

The frequency content of these four variables, as shown in FIG. 13, shows some clear connections between the wing and the surrounding flow. Two primary peaks are seen in both the PIV POD spectra and the shear layer height spectra, at 47 Hz and 66 Hz. Assuming the peak at 47 Hz to be a <1-2> mode resonance peak, $f_{12}$, it can be noted that 66 Hz is equal to the square root of 2 times $f_{12}$. Because the vibration frequency of a square membrane is defined as:

$$f_{nm} = \frac{1}{2c}\sqrt{\frac{E(\lambda-1)}{\rho_m}}\sqrt{n^2+m^2},$$

where c is the membrane chord, E is the Young's modulus, γ is the applied prestretch, and $\sigma_m$ is the membrane density, it can be seen that the square root of 2 factor is consistent with the ratio of $f_{12}$ to $f_{13}$. Just as the membrane dynamics were seen to be dominated by <1-2> and <1-3> modes, the dominant frequencies in the surrounding flow field are connected by the same factor.

The frequency peaks of the lift and capacitance however occur at double the frequency peaks of the shear layer height and PIV POD, suggesting that both lift and capacitance are agnostic as to the phase of vibration. This frequency doubling is likely tied to the nature of the membrane vibration and surrounding vorticity fields. In the POD analysis of both these variables, most of the energy was seen to be in the <1-2> vibration mode, such that vorticity in membrane stretch had a node of minimal vibration at approximately 0.5 c. However, capacitance would essentially rectify this sinusoidal stretch, resulting in a frequency doubling.

Figures 14A, 14B:
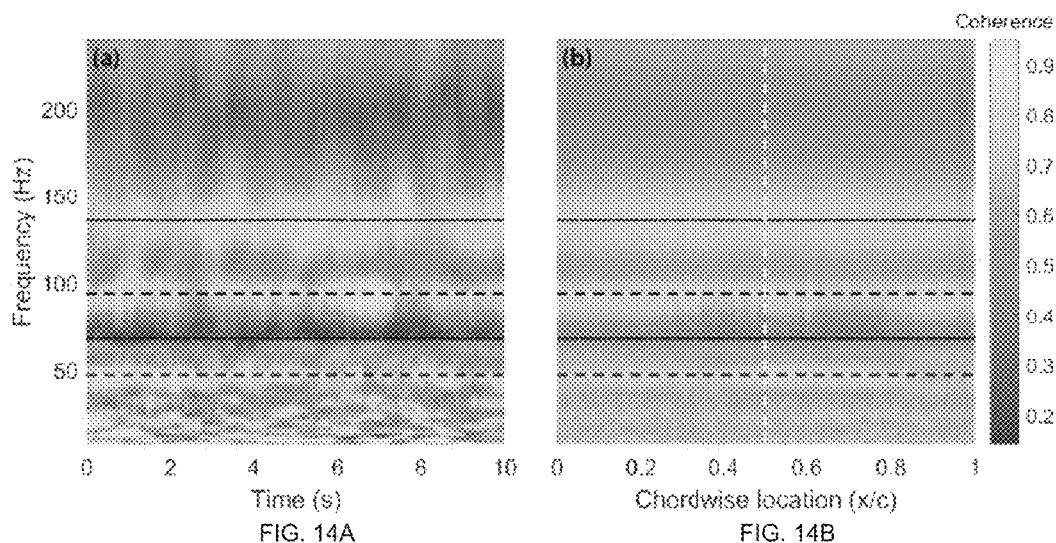
FIGS. 14A and 14B are exemplary graphs.

To better understand the connection between lift, capacitance, and flow structures, the coherence between the various quantities can be measured. Perfect coherence indicates that two signals have a constant phase lag, identical frequency content, and identical wave forms. To measure coherence as a function of time and frequency, the Morelet wavelet coherence was computed using MATLAB's Wavelet Toolbox from the Mathworks, Natick, Mass. The coherence of lift with the shear layer location measured at 0.5 c is shown in FIG. 14A over time. Bands of relatively high coherence are seen at $f_{12}$, $2f_{12}$ and $f_{13}$, with minimal coherence at $f_{13}$. Although the lift signal has very little energy at $f_{12}$, and the shear layer measurement has very little energy at 2 $f_{12}$ and $2f_{13}$, the energy present at these frequencies indicate high correlation between lift and the shear layer location.

Because the shear layer location is measured at every chord-wise location on the wing, the coherence with lift can also be calculated as a function of location, as shown in FIG. 14B. In this case, each vertical cross-section represents the time average coherence of the lift and shear layer location. Coherence is seen to be independent of location on the wing.

Ultimately, for capacitance to be a useful sensing device for the surrounding flow structures, coherence between the capacitance and the flow field must be demonstrated. Because capacitance inherently measures the deflection of the whole membrane, a variable that captures the full flow field is the most likely to be coherent with capacitance. This is accomplished by using the coefficients of the first two POD modes of the PIV field immediately above the membrane. By measuring the coherence of the capacitance with POD mode coefficients, two field quantities can be compared.

Figures 15A, 15B:
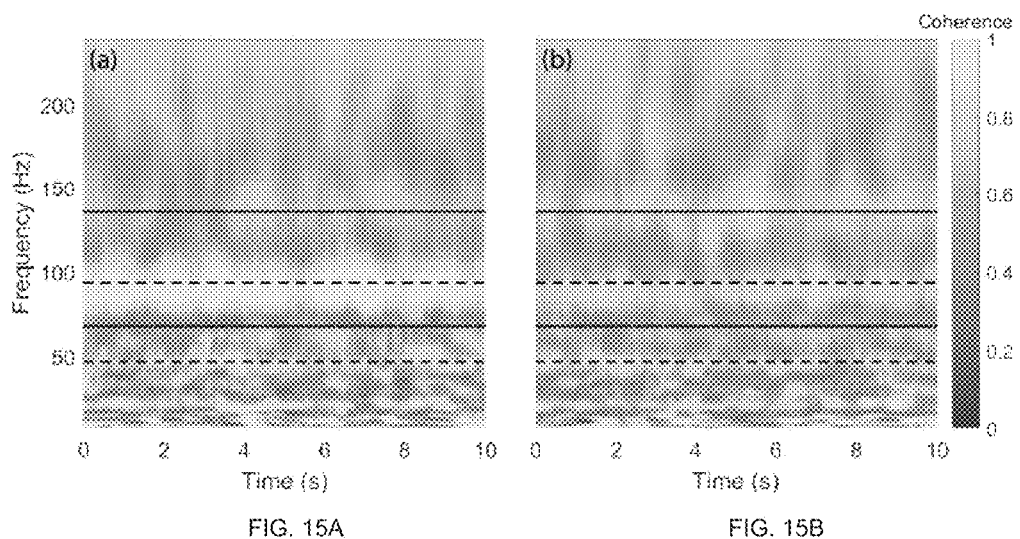
FIGS. 15A and 15B are exemplary graphs.

As shown in FIG. 15A, for the first PIV POD mode, the POD coefficients and capacitance show a high level of coherence at $2f_{12}$ across the full time span measured, with much lower levels of coherence seen at other frequencies. This frequency doubling is consistent with capacitance measured during <1-2> mode variations. The high level of coherence at a frequency relevant to the surrounding flow field demonstrates that capacitive self-sensing can be used to detect relevant flow structures that interact with the membrane wing.

When extending the analysis to the second POD modal coefficient (see FIG. 15B), some additional coherence can be seen in the $f_{13}$ band. Considering the relative contributions of the <1-2> and <1-3> modal vibrations to the membrane dynamics, it is seen that <1-2> accounts for 61% of the total energy, while the <1-3> mode captures only an additional 20% of the total energy. Because of this differential in total energy, it is not surprising that the strongest coupling between membrane deformation and the surrounding flow field is seen in the <1-2> mode. However, the enhanced coherence at $f_{13}$ does suggest that hire order flow structures can be sensed using membrane wing capacitance.

In summary, the present invention provides capacitive self-sensing to be effective in detecting wing membrane camber above a noise flow of roughly 4% camber. Because membrane wings are dynamically self-cambering based on the instantaneous aerodynamic loading, camber sensing naturally leads to the ability to approximate the steady and unsteady aerodynamic pressure that the wing is experiencing. Because the dynamic component of the aerodynamic pressure is largely influenced by flow structures surrounding the wing, it is possible to show the connection between unsteady capacitance and changes in the surrounding flow. In this case, the unsteady oscillation of the relative location of the shear layer above the membrane is highly coherent at the frequency of oscillation.

It would be appreciated by those skilled in the art that various changes and modifications can be made to the illustrated embodiments without departing from the spirit of the present invention. All such modifications and changes are intended to be within the scope of the present invention except as limited by the scope of the appended claims.

What is claimed is:

1. A method comprising:
   providing an extensible membrane wing;
   performing integrated camber sensing, a camber measured via capacitance of a dielectric elastomer membrane that is sandwiched between two compliant electrodes,
   wherein a relationship between capacitance and camber is defined; and estimating a load on the extensible membrane wing using the camber.

2. The method of claim 1 wherein the relationship is geometric.

3. The method of claim 2 wherein the geometric relationship is a spherical cap.

4. The method of claim 1 wherein the capacitance is measured using a recursive least squares (RLS) adaptive algorithm.

5. A method comprising:
   simultaneously controlling and sensing aerodynamic loading of a membrane wing using a capacitance of the membrane, the membrane wing stretching under aerodynamic load, leading to thinning of a membrane thickness and increased capacitance; and
   using knowledge of the membrane's elastic and dielectric material properties to determine an amount of steady aerodynamic lift being generated and time-dependent properties.

6. The method of claim 5 wherein the time-dependent properties include time-dependent capacitance.

7. The method of claim 5 wherein the time-dependent properties are related to a vortex shedding frequency and amplitude.

8. The method of claim 5 wherein a relationship between capacitance and camber of the membrane is used to infer a camber.

9. The method of claim 8 wherein a lift is inferred from the camber.

10. The method of claim 8 wherein the camber is measured by a capacitance of the dielectric elastomer membrane.

11. The method of claim 10 wherein a mean aerodynamic load is captured by applying an aeroelastic analysis to the measured camber.

* * * * *